US012693154B2

(12) United States Patent (10) Patent No.: US 12,693,154 B2

Uenoyama (45) Date of Patent: Jul. 28, 2026

(54) PHOTODETECTOR

(71) Applicant: HAMAMATSU PHOTONICS K.K., Hamamatsu (JP)

(72) Inventor: Soh Uenoyama, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 395 days.

(21) Appl. No.: 18/279,263

(22) PCT Filed: Dec. 9, 2021

(86) PCT No.: PCT/JP2021/045360

§ 371 (c)(1),
(2) Date: Aug. 29, 2023

(87) PCT Pub. No.: WO2022/190492

PCT Pub. Date: Sep. 15, 2022

(65) Prior Publication Data

US 2024/0145493 A1 May 2, 2024

(30) Foreign Application Priority Data

Mar. 11, 2021 (JP) ................................. 2021-039297

(51) Int. Cl.
*G01J 1/04* (2006.01)
*G01T 1/20* (2006.01)
(52) U.S. Cl.
CPC ........... *G01J 1/0411* (2013.01); *G01T 1/2002* (2013.01)
(58) Field of Classification Search
CPC ..... G01J 1/0411; G01J 1/4228; G01T 1/2002; H10F 39/806; H10F 30/225; H10F 39/807; H10F 77/413
See application file for complete search history.

(56) References Cited

U.S. PATENT DOCUMENTS 5,617,131 A * 4/1997 Murano ............. H04N 25/7013
257/E31.127
5,682,203 A * 10/1997 Kato ..................... H10F 77/413
348/340

(Continued)

FOREIGN PATENT DOCUMENTS

CN 106601697 A * 4/2017 ............ H10F 39/811
JP 2007-057622 A 3/2007

(Continued)

OTHER PUBLICATIONS

International Preliminary Report on Patentability mailed Sep. 21, 2023 for PCT/JP2021/045360.

(Continued)

*Primary Examiner* — Kiho Kim

(74) *Attorney, Agent, or Firm* — Faegre Drinker Biddle & Reath LLP

(57) ABSTRACT

There is provided a photodetector including: a photodetecting element having a surface and including a plurality of light-receiving regions arranged along the surface; and a plurality of meta-lens portions arranged on the surface to correspond to the plurality of light-receiving regions, wherein, in one light-receiving region and one meta-lens portion corresponding to each other among the plurality of light-receiving regions and the plurality of meta-lens portions, the one meta-lens portion includes a plurality of meta-lenses arranged along the surface.

8 Claims, 14 Drawing Sheets

(56) References Cited

U.S. PATENT DOCUMENTS

| | | | | |
|---|---|---|---|---|
| 5,739,548 | A | * | 4/1998 | Shigeta .............. H10F 39/8063 |
| | | | | 349/110 |
| 2015/0309218 | A1 | | 10/2015 | Shalaev et al. |
| 2018/0216797 | A1 | | 8/2018 | Khorasaninejad et al. |
| 2019/0019828 | A1 | | 1/2019 | Johnson et al. |
| 2019/0044003 | A1 | | 2/2019 | Heck et al. |
| 2019/0361222 | A1 | | 11/2019 | Gurin |
| 2019/0383910 | A1 | | 12/2019 | Dunn et al. |
| 2020/0264043 | A1 | | 8/2020 | Allen |
| 2020/0321378 | A1 | | 10/2020 | Paiella et al. |
| 2020/0355913 | A1 | | 11/2020 | Park et al. |

FOREIGN PATENT DOCUMENTS

| | | | |
|---|---|---|---|
| JP | 2015-092234 | A | 5/2015 |
| JP | 2018-156984 | A | 10/2018 |
| JP | 2019-197097 | A | 11/2019 |
| JP | 2020-531917 | A | 11/2020 |
| JP | 2021-002542 | A | 1/2021 |
| WO | 2019/043016 | A1 | 3/2019 |
| WO | 2020/170841 | A1 | 8/2020 |

OTHER PUBLICATIONS

Mikheeva, E. et al, "CMOS-compatible all-dielectric metalens for improving pixel photodetector arrays," APL Photonics 5, 116105 (2020).

* cited by examiner

PHOTODETECTOR

TECHNICAL FIELD

The present disclosure relates to photodetectors.

BACKGROUND ART

Non Patent Literature 1 discloses a photodetector including a photodetecting element including a plurality of light-receiving regions and a plurality of meta-lenses arranged on the plurality of light-receiving regions. Non Patent Literature 1 has been proposed to improve a light detection efficiency and the like of the photodetector by increasing a transmittance and a light condensing efficiency of each meta-lens and by increasing a depth of focus of each meta-lens.

CITATION LIST

Non Patent Literature

Non Patent Literature 1: E. Mikheeva, 12 others, "CMOS-compatible all-dielectric meta-lens for improving pixel photodetector arrays", APL Photonics 5, 116105 (2020), submission date: Jul. 17, 2020, online publication date: Nov. 13, 2020

SUMMARY OF INVENTION

Technical Problem

From the viewpoint of thinning the photodetector and reducing optical loss, it is desirable that each meta-lens is arranged at a position close to a surface of a photodetecting element. However, in the photodetector described in Non Patent Literature 1, since one meta-lens corresponds to one light-receiving region, when a distance from the one meta-lens to the surface of the photodetecting element is too small, a numerical aperture of the one meta-lens becomes too large, and thus, there is a concern that a function of the meta-lens as a lens is impaired, so that stray light may increase.

The present disclosure is to provide a photodetector capable of promoting thinning and reduction in optical loss while maintaining a function of a meta-lens as a lens.

Solution to Problem

According to one aspect of the present disclosure, there is provided a photodetector includes a photodetecting element having a surface and including a plurality of light-receiving regions arranged along the surface, and a plurality of meta-lens portions arranged on the surface to correspond to the plurality of light-receiving regions, and in one light-receiving region and one meta-lens portion corresponding to each other among the plurality of light-receiving regions and the plurality of meta-lens portions, the one meta-lens portion includes a plurality of meta-lenses arranged along the surface.

In the photodetector of one aspect of the present disclosure, a plurality of meta-lenses correspond to one light-receiving region. Accordingly, even when the distance from each meta-lens portion to the surface of the photodetecting element is reduced, the numerical aperture of each meta-lens can be set reasonably by adjusting an area and the like of each meta-lens according to the distance. In addition, since the distance from each meta-lens portion to the surface of the photodetecting element can be reduced, robustness against an incident angle of incident light can be improved. Therefore, according to the photodetector of one aspect of the present disclosure, it is possible to promote the thinning and the reduction in the optical loss while maintaining the function of the meta-lens as a lens.

In the photodetector of one aspect of the present disclosure, the photodetecting element may further include an isolation region isolating each of the plurality of light-receiving regions, and in the one light-receiving region and the one meta-lens portion corresponding to each other, the plurality of meta-lenses may be configured to condense light within the one light-receiving region. Accordingly, while suppressing the occurrence of crosstalk between the adjacent light-receiving regions, the optical loss can be reduced more reliably.

In the photodetector of one aspect of the present disclosure, the isolation region may be a trench. Accordingly, the occurrence of crosstalk between the adjacent light-receiving regions can be easily and reliably suppressed.

In the photodetector of one aspect of the present disclosure, a light-transmitting layer may be further provided arranged between the surface and the plurality of meta-lens portions. Accordingly, since the distance from each meta-lens portion to the surface of the photodetecting element can be adjusted, the numerical aperture of each meta-lens can be set more appropriately.

In the photodetector of one aspect of the present disclosure, the light-transmitting layer may be formed directly on the surface, and the plurality of meta-lens portions may be formed directly on the light-transmitting layer. Accordingly, since the number of interfaces existing between the meta-lens portion and the light-receiving region is reduced, the optical loss due to reflection at interfaces and the like can be reduced.

In the photodetector of one aspect of the present disclosure, in the one light-receiving region and the one meta-lens portion corresponding to each other, the one meta-lens portion may have a first meta-lens and a plurality of second meta-lenses as the plurality of meta-lenses, an area of the first meta-lens may be larger than an area of each of the plurality of second meta-lenses, and the plurality of second meta-lenses may be arranged to surround the first meta-lens. Accordingly, the number of plurality of meta-lenses corresponding to one light-receiving region can be reduced while maintaining the function of the meta-lens as a lens.

In the photodetector of one aspect of the present disclosure, in the one light-receiving region and the one meta-lens portion corresponding to each other, when a distance from the one meta-lens portion to a surface of the one light-receiving region is denoted by T ($\mu$m), and an area of the one meta-lens portion is denoted by S ($\mu$m$^2$), T may be $1.0S^{0.5}$ or less. Accordingly, for the size of the meta-lens portion, since the distance from the meta-lens portion to the surface of one light-receiving region can be allowed to be sufficiently small, it is possible to further promote the thinning and the reduction in the optical loss.

Advantageous Effects of Invention

According to the present disclosure, it is possible to provide a photodetector capable of promoting thinning and reduction in optical loss while maintaining a function of a meta-lens as a lens.

BRIEF DESCRIPTION OF DRAWINGS

FIG. 13 is a bottom view of a photodetecting element of Modified Example.

DESCRIPTION OF EMBODIMENTS

Figure 1:
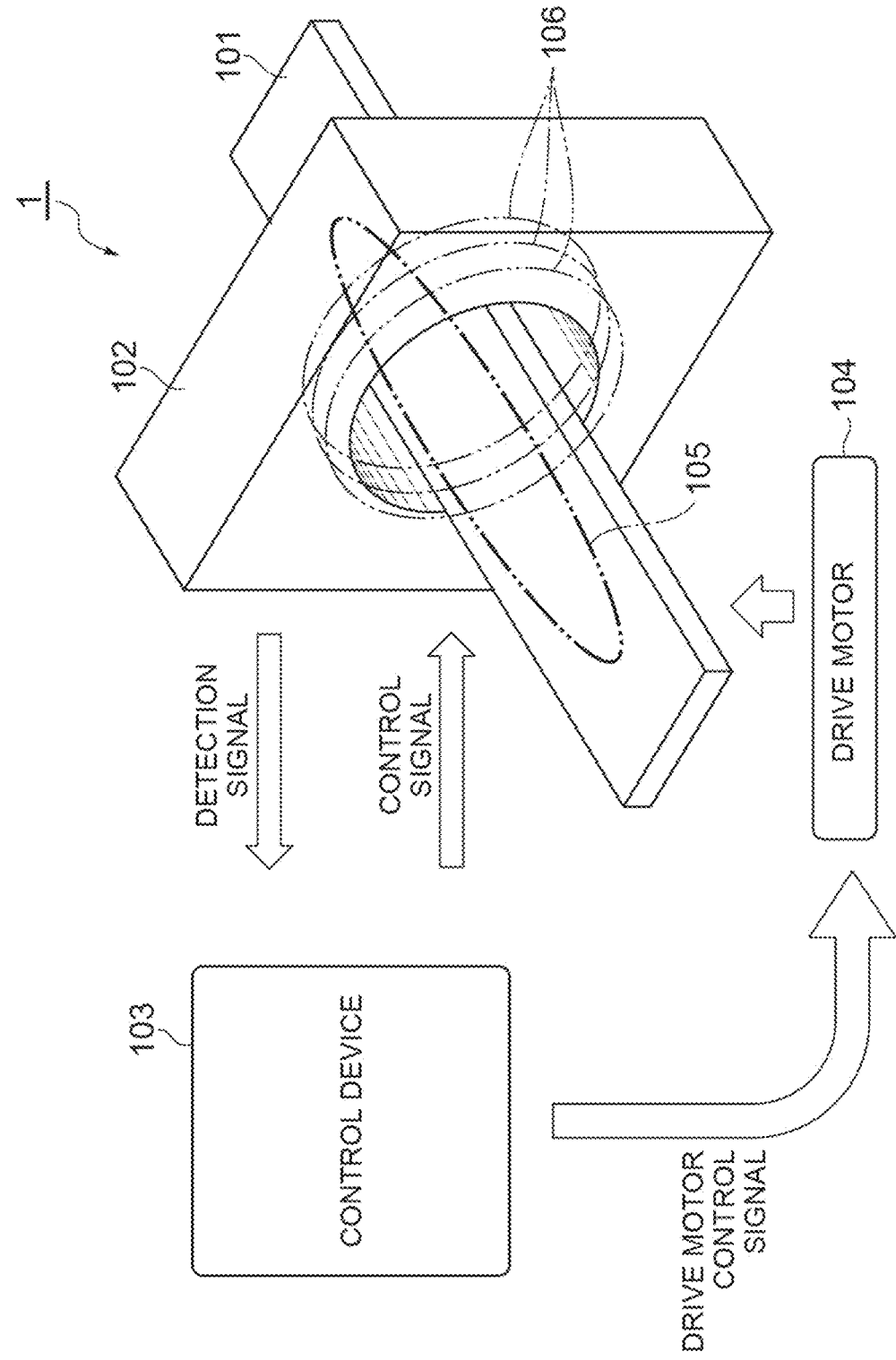
FIG. 1 is a configuration diagram of a PET apparatus according to one embodiment.

Hereinafter, embodiments of the present disclosure will be described in detail with reference to the drawings. Note that, in each figure, the same or corresponding components are denoted by the same reference numerals, and redundant description will be omitted.

As illustrated in FIG. 1, a PET apparatus 1 includes a cradle 101, a gantry 102, a control device 103, and a drive motor 104. The cradle 101 is arranged to pass through an opening of the gantry 102. A detection subject 105 is placed on the cradle 101. The control device 103 controls the drive motor 104 according to a drive motor control signal. Accordingly, the cradle 101 on which the detection subject 105 is placed moves, so that a relative position of the detection subject 105 with respect to the opening of the gantry 102 changes. The drive motor 104 may be configured to move the gantry 102 and may be configured to move the cradle 101 and the gantry 102.

The gantry 102 has a plurality of radiation detection devices 106. The plurality of radiation detection devices 106 are arranged along the direction in which the opening of the gantry 102 penetrates. Each radiation detection device 106 surrounds the opening of the gantry 102. The control device 103 inputs a control signal for controlling each radiation detection device 106 to the gantry 102. The gantry 102 outputs a detection signal detected by each radiation detection device 106 to the control device 103.

Figure 2:
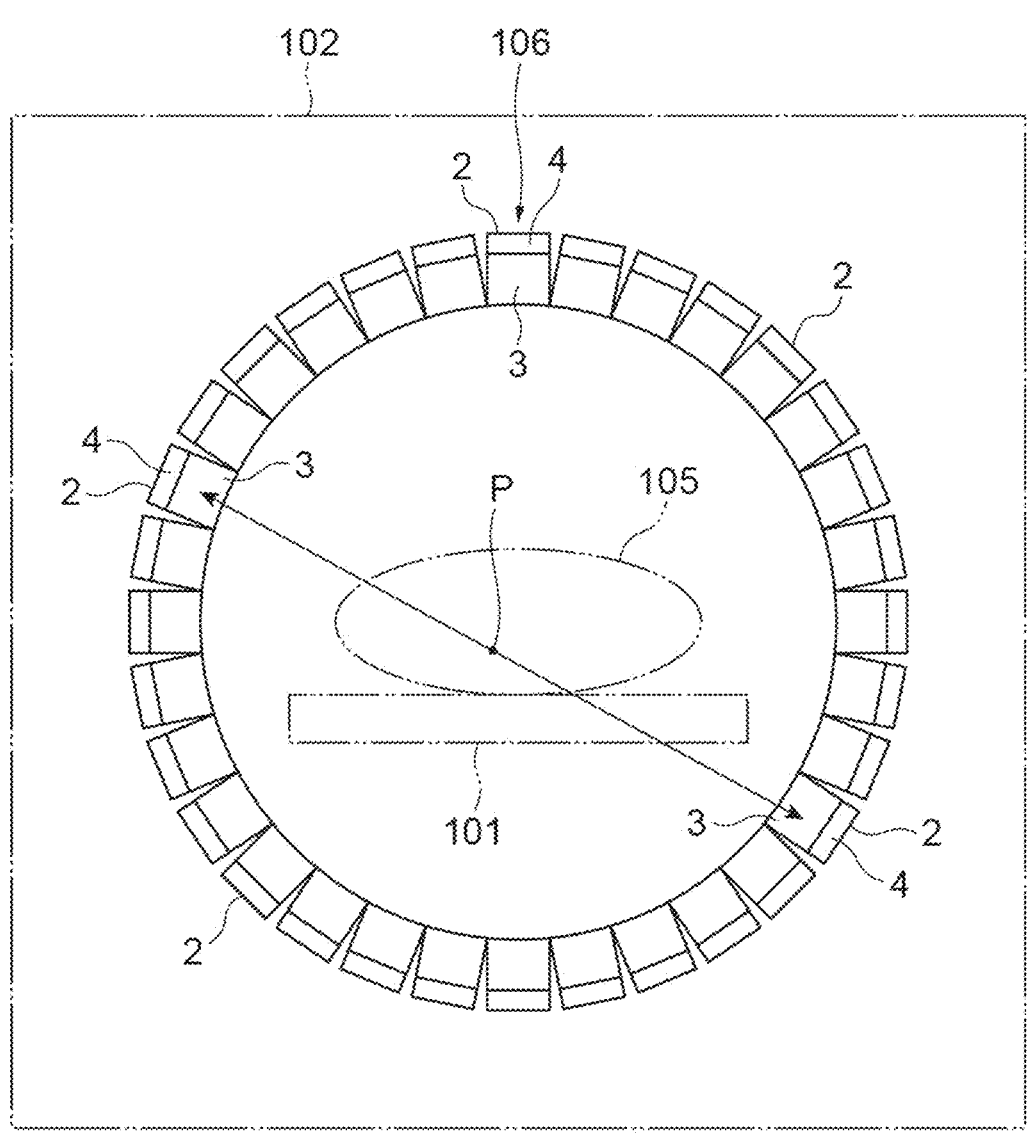
FIG. 2 is a configuration diagram of a radiation detection device illustrated in FIG. 1.

As illustrated in FIG. 2, the radiation detection device 106 includes a plurality of radiation detectors 2. The plurality of radiation detectors 2 are arranged in an annular shape to surround the opening of the gantry 102. A type of radioactive isotope that emits positrons (positron-emitting nuclide) is implanted in the detection subject 105. The positrons are allowed to combine with negative electrons in the detection subject 105 to generate annihilation γ-rays. The annihilation γ-ray is emitted in the opposite direction from a position P of the radioactive isotope within the detection subject 105.

Accordingly, the annihilation γ-ray is detected by a pair of the radiation detectors 2 facing each other with the position P interposed therebetween. The control device 103 specifies the position P based on a time-of-flight difference of the annihilation γ-rays and generates an image (tomographic image) regarding internal information of the detection subject 105. That is, the PET apparatus 1 is a TOF-PET apparatus.

Figure 3:
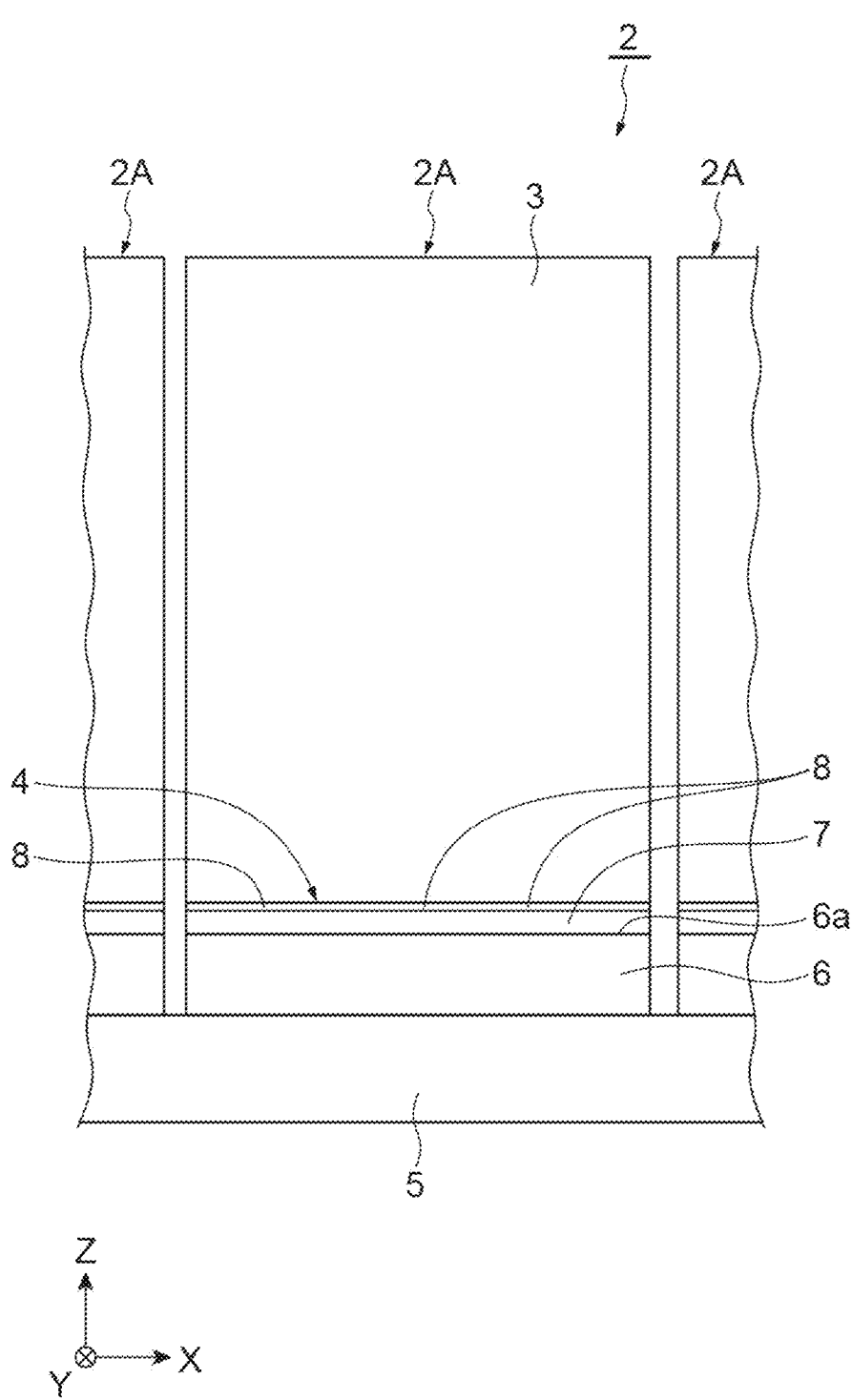
FIG. 3 is a side view of a radiation detector illustrated in FIG. 2.

As illustrated in FIG. 3, the radiation detector 2 has a plurality of radiation detection units 2A. The plurality of radiation detection units 2A are arranged in a matrix shape with an X-axis direction and a Y-axis direction being a row direction and a column direction. Each radiation detection unit 2A has a scintillator (light emitter) 3 and a photodetector 4. It is noted that, in FIG. 3, a Z-axis direction is a radial direction of a ring (refer to FIG. 2) in which the plurality of radiation detectors 2 are arranged, the X-axis direction is a tangential direction of the circular ring, and the Y-axis direction is a direction perpendicular to the Z-axis direction and the X-axis direction.

The scintillator 3 is arranged on a central side (hereinafter referred to as a light incident side) of the opening of the gantry 102 with respect to the photodetector 4 (refer to FIG. 2). The scintillator 3 emits light (fluorescence) upon the incidence of annihilation γ-rays. The scintillator 3 is made of at least one material selected from a group including $Lu_{2-x}$ $Y_xSiO_5:Ce(LYSO)$, gadolinium aluminum gallium garnet (GAGG), NaI(TI), Pr:LuAG, $LaBr_2$, $LaBr_3$, and $(Lu_xTb_{1-x-y}$ $Ce_y)_3Al_5O_{12}$ (that is, LuTAG) or a plurality of mixed materials thereof. It is noted that, in LuTAG, a composition ratio x is in a range of 0.5 to 1.5, and a composition ratio y is in a range of 0.01 to 0.15.

The photodetector 4 detects light emitted by the scintillator 3. The photodetector 4 includes a wiring board 5, a photodetecting element 6, a planarizing film 7, and a plurality of meta-lens portions 8. The wiring board 5 is shared by a plurality of the photodetectors 4. The wiring board 5, the photodetecting element 6, the planarizing film 7, and the meta-lens portion 8 are arranged in this order from the side opposite to the scintillator 3. That is, the scintillator 3 is arranged on the side opposite to the photodetecting element 6 with respect to the meta-lens portion 8. It is noted that the scintillator 3 is bonded to the photodetector 4 with an adhesive having optical transparency.

Figure 4:
FIG. 4 is a plan view of a photodetecting element illustrated in FIG. 3.

As illustrated in FIG. 4, the photodetecting element 6 has a plurality of photodetecting units 10 arranged two-dimensionally and a common electrode E3. As an example, the photodetecting element 6 exhibits a rectangular shape when viewed from the Z-axis direction. The plurality of photodetecting units 10 are arranged in a matrix shape with the X-axis direction and the Y-axis direction being the row direction and the column direction. The common electrode E3 is located in the center of the photodetecting element 6 when viewed from the Z-axis direction. The charges generated in each photodetecting unit 10 are collected in the common electrode E3. That is, the photodetecting element 6 is an SiPM having a plurality of SPADs (photodetecting units 10). It is noted that, in FIG. 4, although the plurality of photodetecting units 10 are illustrated to be provided only in the regions at both ends of the photodetecting element 6, the plurality of photodetecting units 10 are formed in the entire regions of the photodetecting element 6 except for the common electrode E3.

Figure 5:
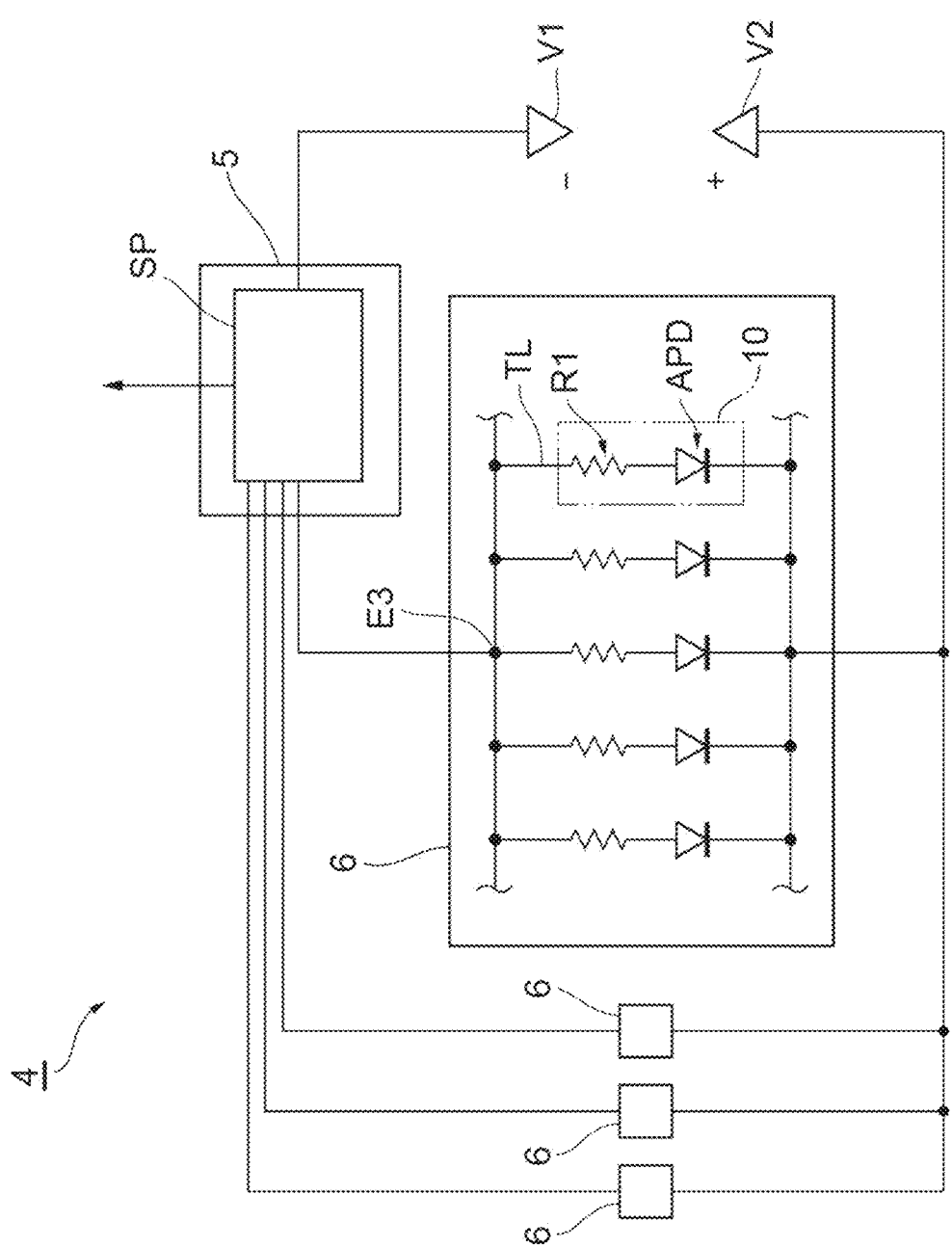
FIG. 5 is a circuit diagram of a photodetector illustrated in FIG. 3.

As illustrated in FIG. 5, each photodetecting unit 10 includes an avalanche photodiode APD and a quenching resistor R1. One end of the quenching resistor R1 is electrically connected to an anode of the avalanche photodiode APD, and the other end of the quenching resistor R1 is electrically connected to the common electrode E3 through a read line TL of the photodetecting element 6. That is, the plurality of photodetecting units 10 are connected in parallel, and in each photodetecting unit 10, the avalanche photodiode APD and the quenching resistor R1 are directly connected. In the photodetecting element 6, each avalanche photodiode APD is operated in a Geiger mode. In the Geiger mode, a reverse voltage (reverse bias voltage) higher than a breakdown voltage of the avalanche photodiode APD is applied to the avalanche photodiode APD. That is, a potential V1 is applied to the anode of the avalanche photodiode APD, and a positive potential V2 with respect to the potential V1 is applied to a cathode of the avalanche photodiode APD. The polarities of these potentials are relative, and for example, any one of the potentials may be a ground potential.

A signal processing unit SP is provided in the wiring board 5. The signal processing unit SP processes signals output from each photodetecting element 6 by using each photodetecting element 6 as each channel. The signal processing unit SP outputs the processed signal (detection signal) to the control device 103 (refer to FIG. 1). The signal processing unit SP constitutes, for example, an application specific integrated circuit (ASIC). The signal processing unit SP may include a CMOS circuit converting a signal output from each photodetecting element 6 into a digital pulse.

Figure 6:
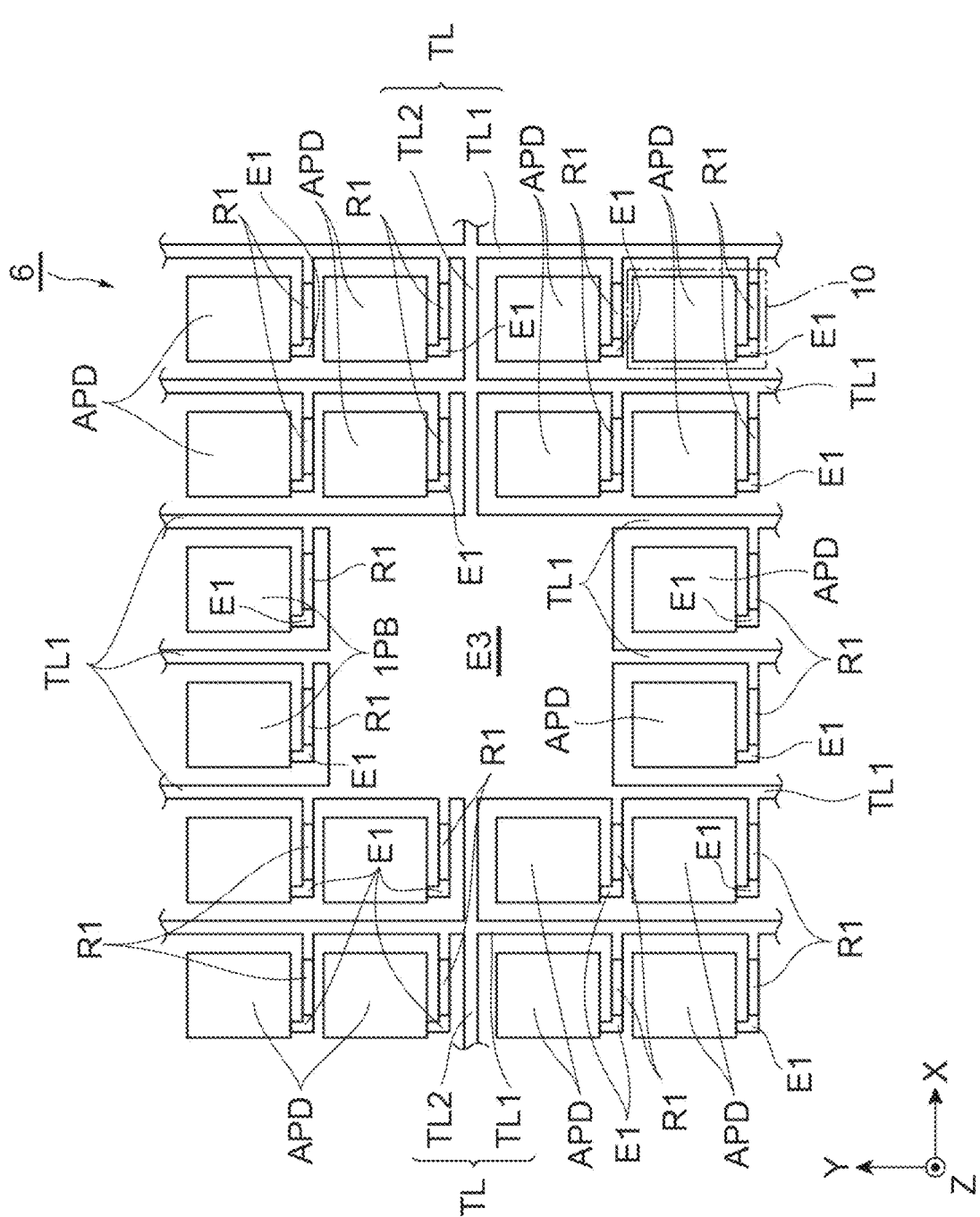
FIG. 6 is a plan view of a portion of the photodetecting element illustrated in FIG. 4.

As illustrated in FIG. 6, in the photodetecting element 6, the read line TL includes a plurality of signal lines TL1 and a plurality of signal lines TL2. As an example, each signal line TL1 extends in the Y-axis direction between the avalanche photodiodes APD adjacent in the X-axis direction, and each signal line TL2 extends in the X-axis direction between the avalanche photodiodes APD adjacent in the Y-axis direction. The plurality of signal lines TL1 and the plurality of signal lines TL2 extend in a lattice shape to be connected to each other at intersections and are electrically connected to the common electrode E3.

In each photodetecting unit 10, one end of the quenching resistor R1 is connected to an electrode E1, and the other end of the quenching resistor R1 is connected to the signal line TL1. That is, in each photodetecting unit 10, one end of the quenching resistor R1 is electrically connected to the anode of the avalanche photodiode APD through the electrode E1, and the other end of the quenching resistor R1 is electrically connected to the common electrode E3 through the read line TL.

Figure 7:
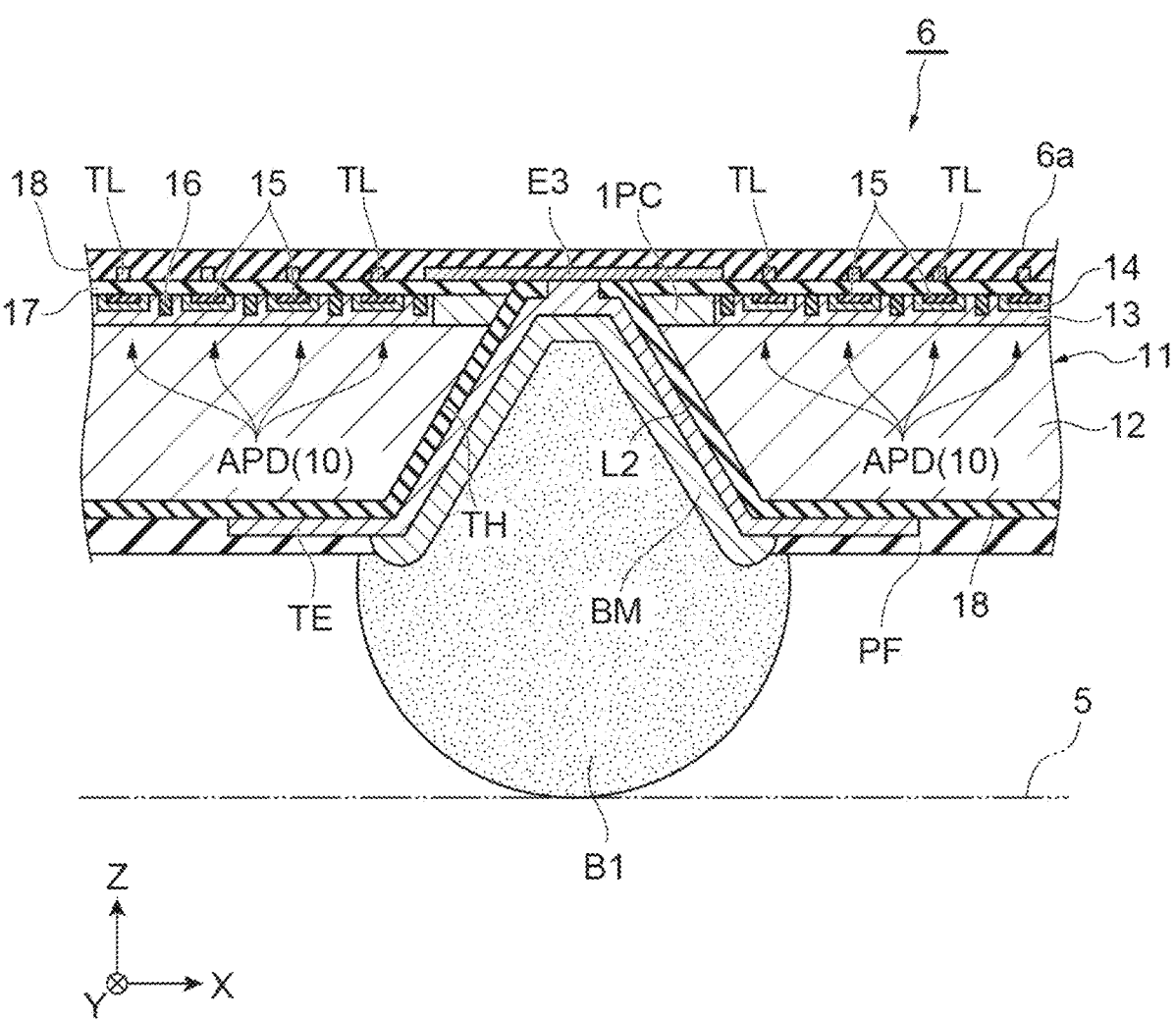
FIG. 7 is a cross-sectional view of a portion of the photodetecting element illustrated in FIG. 4.

As illustrated in FIG. 7, the photodetecting element 6 has a semiconductor layer 11. The semiconductor layer 11 includes an N$^+$ type (first conductivity type) semiconductor region (first semiconductor region) 12, an N-type (first conductivity type) semiconductor region (first semiconductor region) 13, a plurality of P-type (second conductivity type) semiconductor regions (second semiconductor regions) 14, and a plurality of P$^+$ type (second conductivity type) semiconductor region (second semiconductor regions) 15. The semiconductor region 13 is formed on the surface of the semiconductor region 12 on the light incident side. The plurality of semiconductor regions 14 are formed within the semiconductor region 13 along a surface 6a of the photodetecting element 6. The plurality of semiconductor regions 15 are formed in the plurality of semiconductor regions 14 along the surface 6a of the photodetecting element 6. The impurity concentration of the semiconductor region 12 is higher than the impurity concentration of the semiconductor region 13. The impurity concentration of each semiconductor region 15 is higher than the impurity concentration of each semiconductor region 14.

One avalanche photodiode APD is configured with one semiconductor region 15 surrounded by a trench 16, one semiconductor region 14, and the region of the semiconductor regions 12 and 13 overlapping the one semiconductor region 15 in the Z-axis direction in the photodetecting element 6. That is, each avalanche photodiode APD includes the N$^+$-type semiconductor region 12, the N-type semiconductor region 13, the P-type semiconductor region 14 forming a PN junction with the N-type semiconductor region 13, and the P$^+$-type semiconductor region 15. In this embodiment, each avalanche photodiode APD functions as a light-receiving region.

The trench 16 is formed to isolate each avalanche photodiode APD on the light incident side surface of the semiconductor layer 11. That is, the trench 16 is an isolation region isolating each avalanche photodiode APD, which is the light-receiving region. For example, an insulating material such as silicon oxide, a metal material such as tungsten, and polysilicon are placed in the trench 16.

An insulating layer 17 is formed on the surfaces of the semiconductor regions 13, 14, and 15 on the light incident side. The common electrode E3 and the read line TL are arranged on the insulating layer 17. The common electrode E3 and the read line TL are covered with an insulating layer 18. In the photodetecting element 6, the surface of the insulating layer 18 on the light incident side corresponds to the surface 6a of the photodetecting element 6. It is noted that, in each photodetecting unit 10, one end of the quenching resistor R1 (refer to FIG. 6) is electrically connected to the semiconductor regions 14 and 15 of the avalanche photodiode APD, and the other end of the quenching resistor R1 is electrically connected to the read line TL.

In the semiconductor layer 11, a through hole TH is formed. The insulating layer 19 is formed on the inner surface of the through hole TH and the surface of the semiconductor region 12 opposite to the light incident side. On the inner surface of the through hole TH, a through-hole electrode TE is arranged through the insulating layer 19. The through-hole electrode TE is connected to the common electrode E3 at the opening on the light incident side of the through hole TH. On the through-hole electrode TE, a bump electrode B1 is arranged through an under bump metal BM. The through-hole electrode TE and the insulating layer 19 are covered with the passivation film PF. It is noted that the N-type semiconductor region 1PC is formed in the region surrounding the through hole TH on the surface of the semiconductor region 12 on the light incident side. The semiconductor region 1PC prevents the PN junction configured with the semiconductor region 12 and the semiconductor regions 13 and 14 from reaching the through hole TH.

Figure 8:
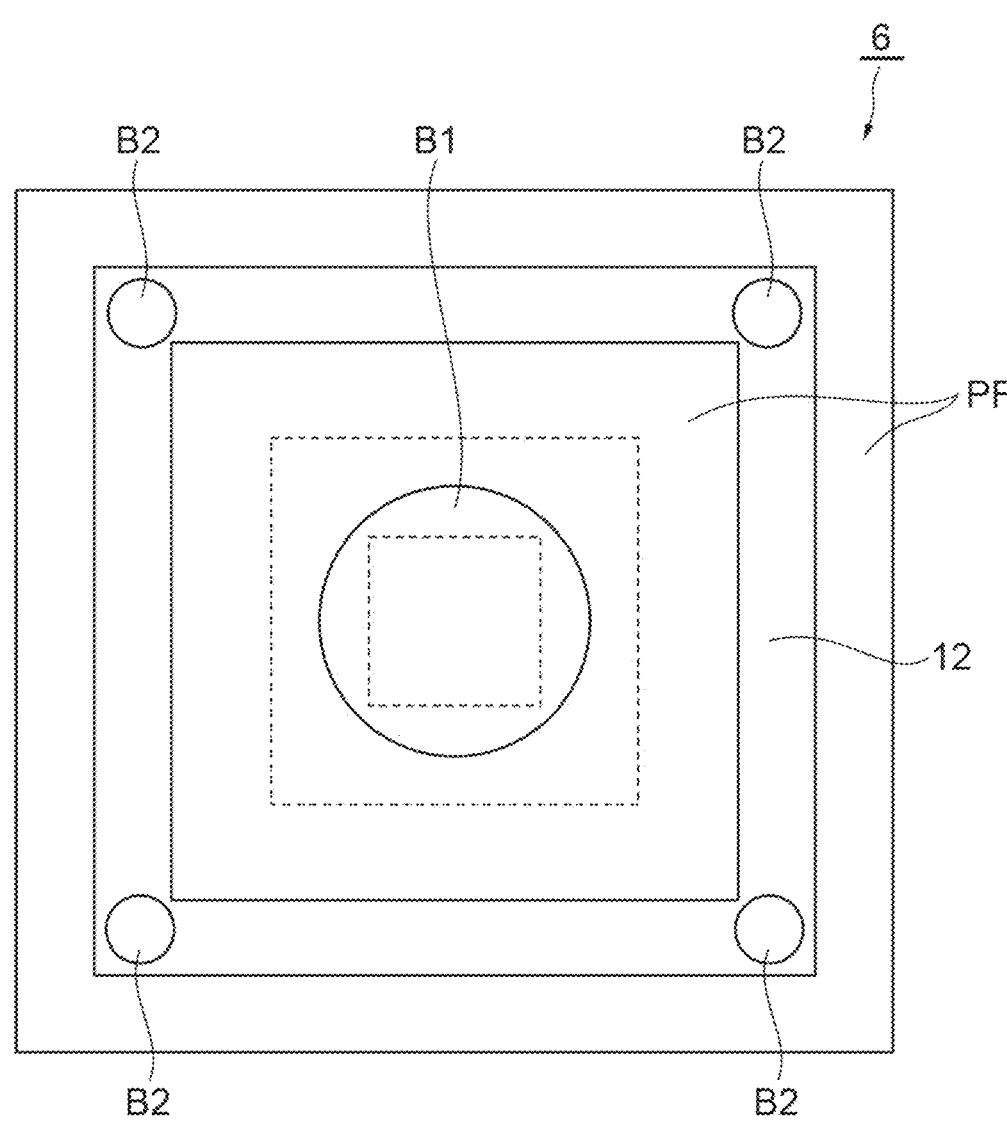
FIG. 8 is a bottom view of the photodetecting element illustrated in FIG. 4.
Figure 8:
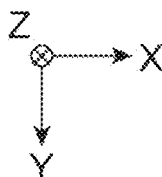

As illustrated in FIG. 8, a groove is formed in the passivation film PF to surround the through hole TH when viewed from the Z-axis direction, and the semiconductor region 12 is exposed within the groove. On the semiconductor region 12 exposed in the groove, a plurality of bump electrodes B2 are arranged. The bump electrode B1 and the plurality of bump electrodes B2 are electrically and physically connected to the wiring board 5 arranged on the side opposite to the plurality of meta-lens portions 8 with respect to the photodetecting element 6. That is, the photodetecting element 6 is electrically and physically connected to the wiring board 5.

In the photodetecting element 6 configured as above, each avalanche photodiode APD is operated in Geiger mode in each photodetecting unit 10. In this state, when light is incident on each avalanche photodiode APD from the surface 6a side, photoelectric conversion occurs in each avalanche photodiode APD, and photoelectrons (charges) are generated in each avalanche photodiode APD. When the photoelectrons are generated, avalanche multiplication occurs at each avalanche photodiode APD, and thus, the amplified electron group (charges) is collected on the common electrode E3 through each semiconductor region 15 and the quenching resistor R1. The charges collected from each photodetecting unit 10 to the common electrode E3 are input as a signal to the signal processing unit SP (refer to FIG. 5) of the wiring board 20.

The semiconductor layer 11 is made of, for example, Si. In the semiconductor layer 11, P-type impurities are, for example, a group 3 element such as B, and N-type impurities are, for example, a group 5 element such as N, P, or As. The method of adding these impurities is, for example, a diffusion method or an ion implantation method. Each of the insulating layers 17, 18, and 19 is made of, for example, $SiO_2$ or SiN. The method of forming each of the insulating layers 17, 18, and 19 is, for example, a thermal oxidation method or a sputtering method. The electrodes E1 and E3 and the through-hole electrode TE are made of, for example, a metal such as aluminum. The method of forming the electrodes E1 and E3 and the through-hole electrode TE is, for example, a sputtering method. The resistivity of the quenching resistor R1 is higher than the resistivity of the electrode E1 and the common electrode E3. The quenching resistor R1 is made of, for example, polysilicon. A method of forming the quenching resistor R1 is, for example, a chemical vapor deposition (CVD) method. The material of the quenching resistor R1 may be, for example, SiCr, NiCr, TaNi, FeCr, or the like.

Figure 9:
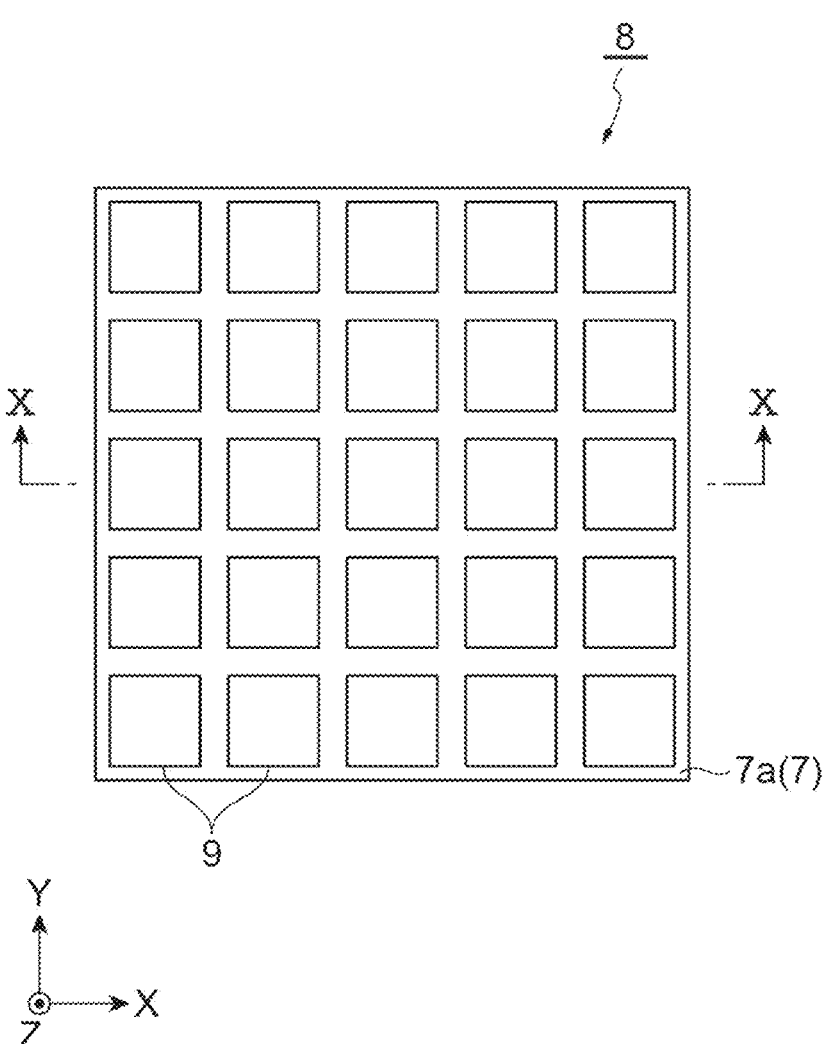
FIG. 9 is a plan view of a portion of a photodetector illustrated in FIG. 3.
Figure 10:
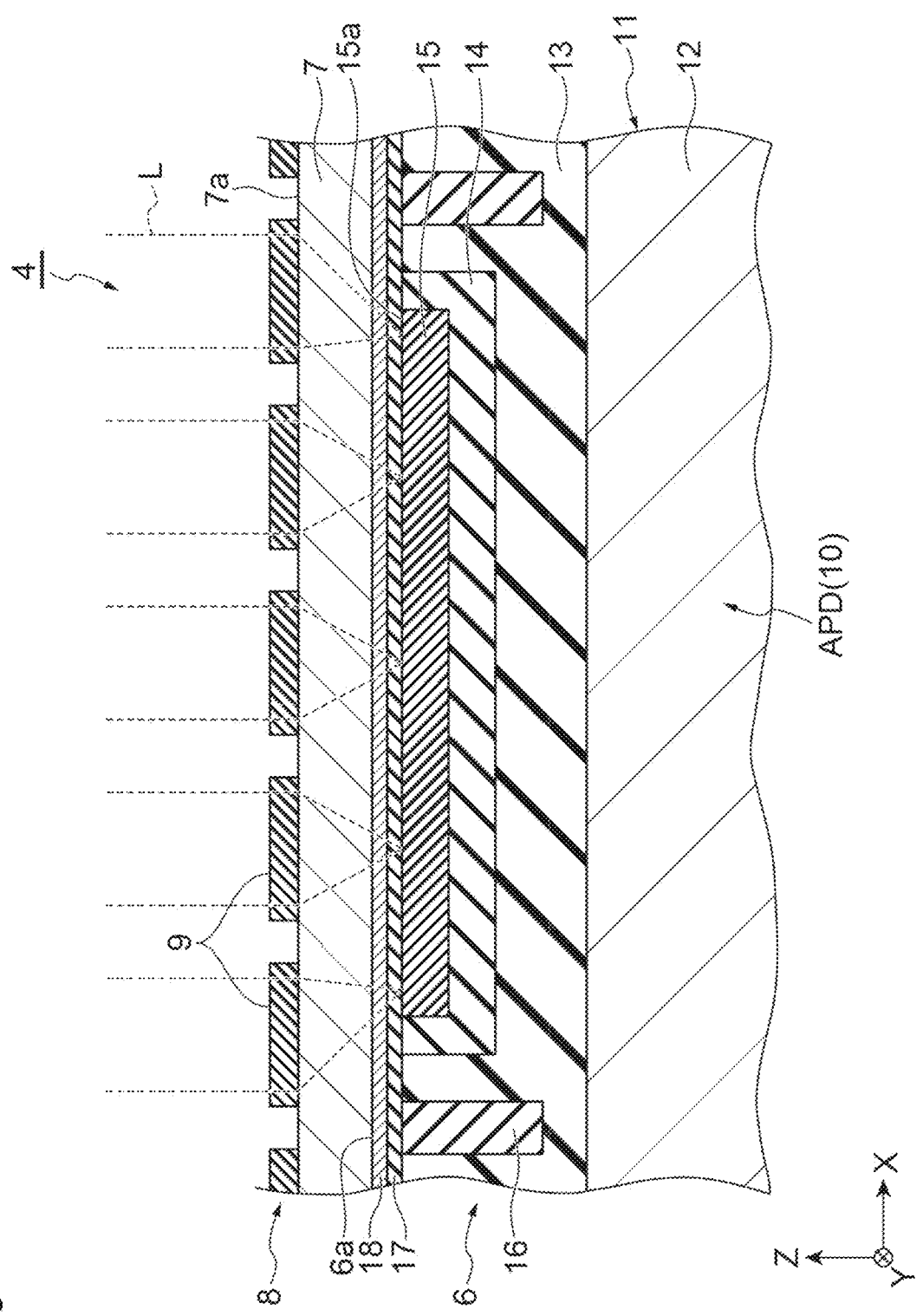
FIG. 10 is a cross-sectional view of a portion of the photodetector along line X-X illustrated in FIG. 9.

As illustrated in FIGS. 3, 9, and 10, the plurality of meta-lens portions 8 are provided on the planarizing film 7. The plurality of meta-lens portions 8 are arranged on the surface 6a of the photodetecting element 6 through the planarizing film 7. Each meta-lens portion 8 is arranged two-dimensionally to overlap each avalanche photodiode APD (that is, each photodetecting unit 10) when viewed from the Z-axis direction (direction perpendicular to the surface 6a). That is, one meta-lens portion 8 corresponds to one avalanche photodiode APD (facing in the Z-axis direction). It is noted that, in FIGS. 9 and 10, only the portion of the photodetector 4 corresponding to the one photodetecting unit 10 is illustrated.

Each meta-lens portion 8 has a plurality of meta-lenses 9 for the one avalanche photodiode APD having the photodetecting unit 10. Each meta-lens 9 is a meta-surface lens formed on a surface 7a of the planarizing film 7. The meta-lens 9 is made of, for example, a meta-lens material such as a-Si, $HfO_2$, $Nb_2O_5$, or $TiO_2$. A method of forming the meta-lens 9 is, for example, a method of forming the plurality of grooves in the planarizing film 7 by performing an etching process on the planarizing film 7. The plurality of meta-lenses 9 are configured to condense light within the avalanche photodiode APD of the one corresponding photodetecting unit 10.

The meta-lens 9 is, for example, configured based on phase design of a Fresnel lens. The outer diameter of the meta-lens 9 is, for example, several μm to several tens of lam. The outer diameter of the meta-lens 9 is designed according to the size of the photodetecting unit corresponding to the meta-lens portion 8 having the meta-lens 9. The thickness of the meta-lens portion 8 in the Z-axis direction is, for example, about 500 nm. A single period of the meta-lens portion 8 is equal to or smaller than the wavelength of light L and, for example, about 250 nm.

The planarizing film 7 is arranged between the surface 6a of the photodetecting element 6 and the plurality of meta-lens portions 8. The planarizing film 7 is a light-transmitting layer formed directly on the surface 6a. The planarizing film 7 is made of, for example, $SiO_2$, GaAs, GaP, Si, SiC, or the like. The method of forming the planarizing film 7 is for example, a thermal oxidation method or a sputtering method. The thickness of the planarizing film 7 is, for example, several μm.

As illustrated in FIG. 10, the one avalanche photodiode APD and each meta-lens 9 in the one meta-lens portion 8 facing each other in the Z-axis direction condense the light L on a surface (that is, the surface 15a of the one corresponding semiconductor region 15) on the light incident side of the corresponding avalanche photodiode APD.

When the distance between the surface (that is, the surface 15a of the semiconductor region 15) on the light incident side and the meta-lens portion 8 in the one avalanche photodiode APD in the Z-axis direction is denoted by T (μm) and the area of the meta-lens portion 8 corresponding to the one avalanche photodiode APD is denoted by S (μm²), the following formula (1) is satisfied.

$$T \leq 1.0 S^{0.5} \tag{1}$$

The area of the meta-lens portion 8 is, for example, several hundreds of μm² to several thousands of μm². For this reason, the distance between the surface on the light incident side and the meta-lens portion 8 in the Z-axis direction in the one avalanche photodiode APD can be set to several tens of lam or less.

As described above, in the photodetector 4, the plurality of meta-lenses 9 correspond to the one avalanche photodiode APD. Accordingly, even when the distance from each meta-lens portion 8 to the surface 6a of the photodetecting element 6 is reduced, the numerical aperture of each meta-lens 9 can be set reasonably by adjusting the area or the like of each meta-lens 9 according to the distance. In addition, since the distance from each meta-lens portion 8 to the surface 6a of the photodetecting element 6 can be reduced, the robustness with respect to the incident angle of the light L can be improved. Therefore, according to the photodetector 4, it is possible to promote the thinning and the reduction in the optical loss while maintaining the function of the meta-lens 9 as a lens.

In the photodetector 4, the photodetecting element 6 includes the trench 16 isolating each avalanche photodiode APD, and in the one avalanche photodiode APD and the one meta-lens portion 8 corresponding to each other, the plurality of meta-lenses 9 are configured to condense light into the one avalanche photodiode APD. Accordingly, while suppressing the occurrence of crosstalk between the adjacent avalanche photodiodes APD, the optical loss can be reduced more reliably.

In the photodetector 4, in the one avalanche photodiode APD and the one meta-lens portion 8 corresponding to each other, a plurality of meta-lenses 9 are configured to avoid the trench 16 and condense light. In the photodetector 4, since the meta-lens portion 8 includes the plurality of meta-lenses 9, and a degree of freedom in the phase design can be improved, design for condensing the light while avoiding the trench 16 can be facilitated. In addition, in the photodetector 4, since the meta-lens portion 8 includes the plurality of meta-lenses 9, and the degree of freedom in the phase design can be improved, design for condensing the light towards a specific region (for example, particularly high sensitive region as a light-receiving region) of the avalanche photodiode APD can also be achieved. The meta-lens 9 can be designed to condense light towards the central region of the avalanche photodiode APD, for example, when the avalanche photodiode APD is viewed from the light incident side. The central region of the avalanche photodiode APD denotes a region existing inside the avalanche photodiode APD, when the avalanche photodiode APD is viewed from the light incident side, and having the same center as the center of the avalanche photodiode APD. The central region of the avalanche photodiode APD has, for example, a shape substantially similar to the shape of the avalanche photodiode APD. The central region of the avalanche photodiode APD may be the light-receiving region and, particularly, a region with high sensitivity. Accordingly, while suppressing the occurrence of crosstalk between the adjacent avalanche photodiodes APD, the optical loss can be reduced more reliably.

In the photodetector 4, the planarizing film 7 is arranged between the surface 6a of the photodetecting element 6 and the plurality of meta-lens portions 8. Accordingly, since the distance from each meta-lens portion 8 to the surface 6a of the photodetecting element 6 can be adjusted, the numerical aperture of each meta-lens 9 can be set more appropriately.

In the photodetector 4, the planarizing film 7 is formed directly on the surface 6a of the photodetecting element 6, and the plurality of meta-lens portions 8 are formed directly on the planarizing film 7. Accordingly, since the number of interfaces existing between the meta-lens portion 8 and the avalanche photodiode APD is reduced, the optical loss due to the reflection at the interfaces or the like can be reduced.

In the photodetector 4, when in the one avalanche photodiode APD and the one meta-lens portion 8 corresponding to each other, the distance from the one meta-lens portion 8 to the surface of the avalanche photodiode APD on the light incident side is denoted by T ($\mu$m) and the area of the one meta-lens portion 8 is denoted by S ($\mu$m$^2$), T is $1.0S^{0.5}$ or less. Accordingly, with respect to the size of the meta-lens portion 8, since the distance from the meta-lens portion 8 to the surface of the avalanche photodiode APD on the light incident side can be allowed to be sufficiently small, it is possible to further promote the thinning and the reduction in the optical loss of the photodetector 4.

In the photodetector 4, when in the one avalanche photodiode APD and the one meta-lens portion 8 corresponding to each other, the distance from the one meta-lens portion 8 to the surface of the avalanche photodiode APD on the light incident side is denoted by T ($\mu$m) and the outer diameter of the one meta-lens 9 in the meta-lens portion 8 is denoted by D ($\mu$m), the condensing angle $\theta$ of the one meta-lens 9 is $\tan^{-1}(D/2T)$. Since each of the plurality of meta-lenses 9 in the meta-lens portion 8 can adjust the outer diameter of each meta-lens 9 depending on the distance from the meta-lens portion 8 to the surface of the avalanche photodiode APD on the light incident side, it is possible to prevent the condensing angle $\theta$ of each meta-lens 9 from becoming too large. Accordingly, by reducing the distance from the one meta-lens portion 8 to the surface of the avalanche photodiode APD on the light incident side, the occurrence of stray light caused by the increase in the condensing angle of the meta-lens can be suppressed.

Figure 11:
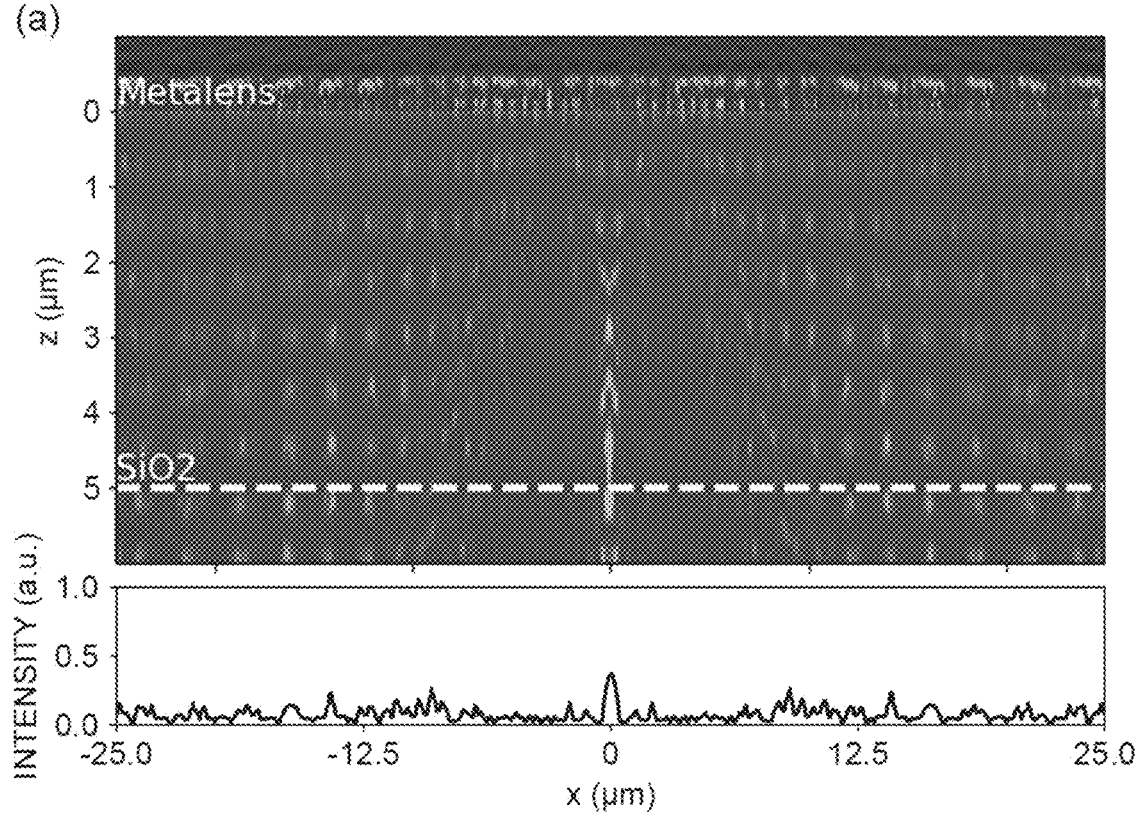
FIG. 11 is a graph illustrating calculation results of electric field intensities of photodetectors of Comparative Example and Example and is a graph illustrating an intensity distribution on a surface of a light-receiving region.
Figure 11:
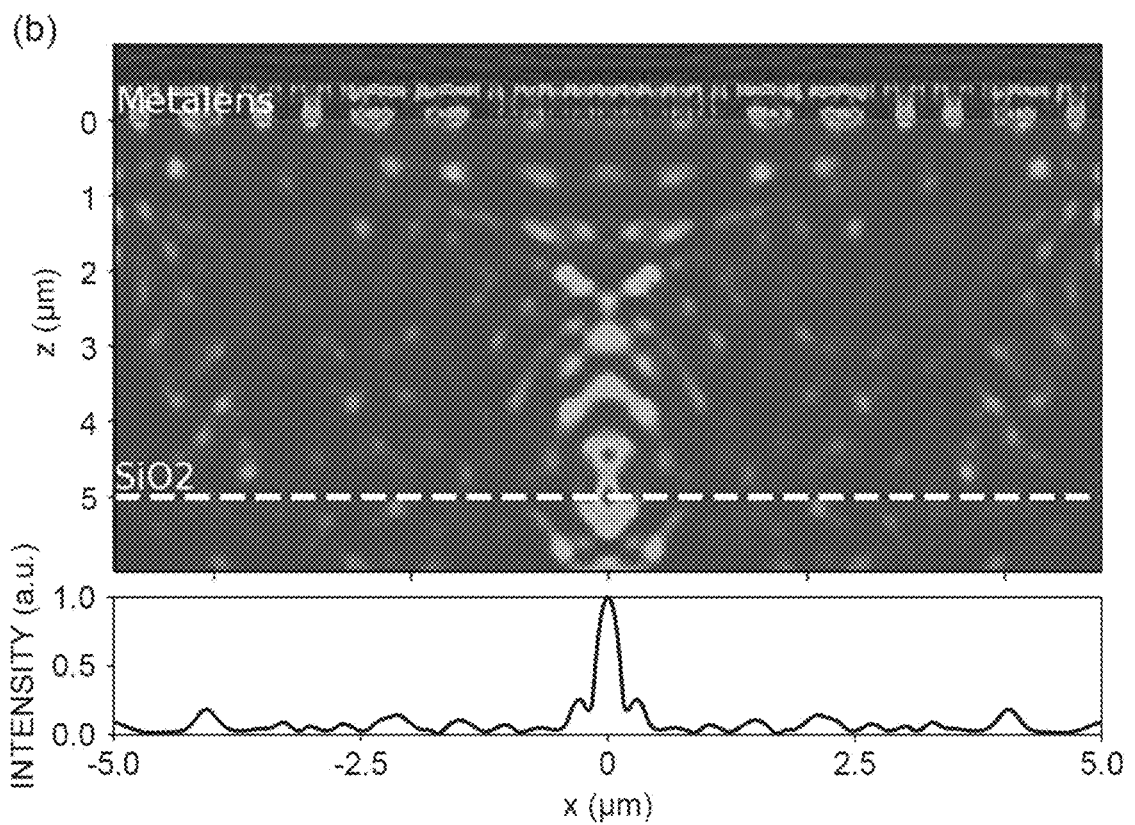

FIG. 11(*a*) is a graph illustrating a calculation result of an electric field intensity of the photodetector in Comparative Example in which the meta-lens portion includes the one meta-lens (outer diameter of 50 $\mu$m) in the one light-receiving region and the one meta-lens portion corresponding to each other and is a graph illustrating an intensity distribution on the surface (Z=5 $\mu$m) of the light-receiving region for the one meta-lens. FIG. 11(*b*) is a graph illustrating a calculation result of the electric field intensity in Example in which the meta-lens portion includes the plurality of (25 pieces for one light-receiving region) meta-lens (outer diameter of 10 $\mu$m) in the one light-receiving region and the one meta-lens portion corresponding to each other and an intensity distribution on the surface (Z=5 $\mu$m) of the light-receiving region for the one meta-lens of the photodetector. In the photodetectors in Comparative Example and Example, both the distances from the meta-lens to the surface of the light-receiving region are set to 5 $\mu$m, each meta-lens is designed to condense light at the center (X=0 $\mu$m) of the meta-lens. The graphs illustrating the calculation results of the electric field intensity in FIGS. 11(*a*) and 11(*b*) are the results of calculation of the electric field intensity in the range from the center (X=0 $\mu$m) of the one meta-lens to the outer circumference of the meta-lens when light with a wavelength of 404 nm is applied perpendicularly to the light-receiving region by an FDTD method. As illustrated in FIG. 11(*a*), when the meta-lens portion includes the one meta-lens, if the intensity at the center of the meta-lens is compared with the intensity at the position other than the center of the meta-lens, no significant difference is observed, and stray light at the position other than the center of the meta-lens is confirmed. On the other hand, as illustrated in FIG. 11(*b*), when the meta-lens portion includes the plurality of meta-lenses, if the intensity at the center of the meta-lens is compared with the intensity at the position other than the center of the meta-lens, a significant difference is observed, and thus, stray light at the positions other than the center of the meta-lens can be suppressed. This is because the generation of stray light can be suppressed depending on the distance from the meta-lens to the surface of the light-receiving region, by adjusting the outer diameter of the meta-lens to prevent the condensing angle of the meta-lens from becoming too large.

Figure 12:
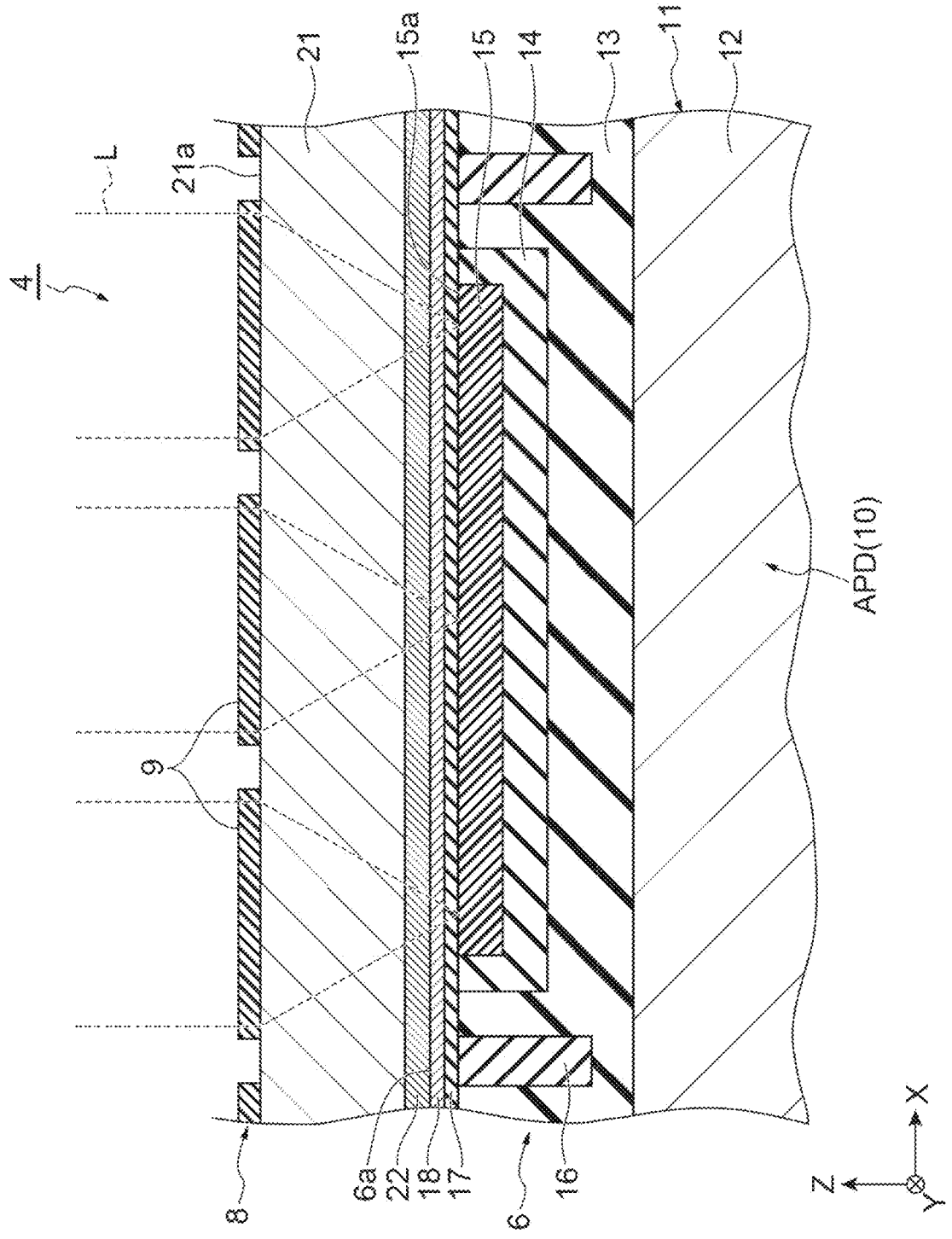
FIG. 12 is a cross-sectional view of a portion of a photodetector according to Modified Example.

The present disclosure is not limited to the above embodiments. For example, the planarizing film 7 may be an insulating layer covering the read line TL, and the surface of the insulating layer 17 on the light incident side may be the surface 6a of the photodetecting element 6. In addition, as illustrated in FIG. 12, the plurality of meta-lens portions 8 are arranged on a surface 21a of a light transmissive substrate 21, and the light transmissive substrate 21 may be bonded to the surface 6a through a light transmissive adhesive layer 22 formed on the surface 6a of the photodetecting element 6. The method of forming the meta-lens portion 8 on the light transmissive substrate 21 is a method of forming the plurality of meta-lens portions 8 on the surface 21a of the light transmissive substrate 21, for example, by forming a film made of a meta-lens material on the surface 21a of the light transmissive substrate 21, forming an EB mask layer on the film by EB lithography, and performing an etching process on the corresponding film and the corresponding layer.

The thickness of the light transmissive substrate 21 is, for example, several tens of $\mu$m to several hundreds of lam. In the one avalanche photodiode APD and the one meta-lens portion 8 corresponding to each other, the size of the meta-lens 9 arranged on the surface 21a of the light transmissive substrate 21 can be adjusted according to the distance from the meta-lens portion 8 to the surface of the avalanche photodiode APD on the light incident side.

Figure 13:
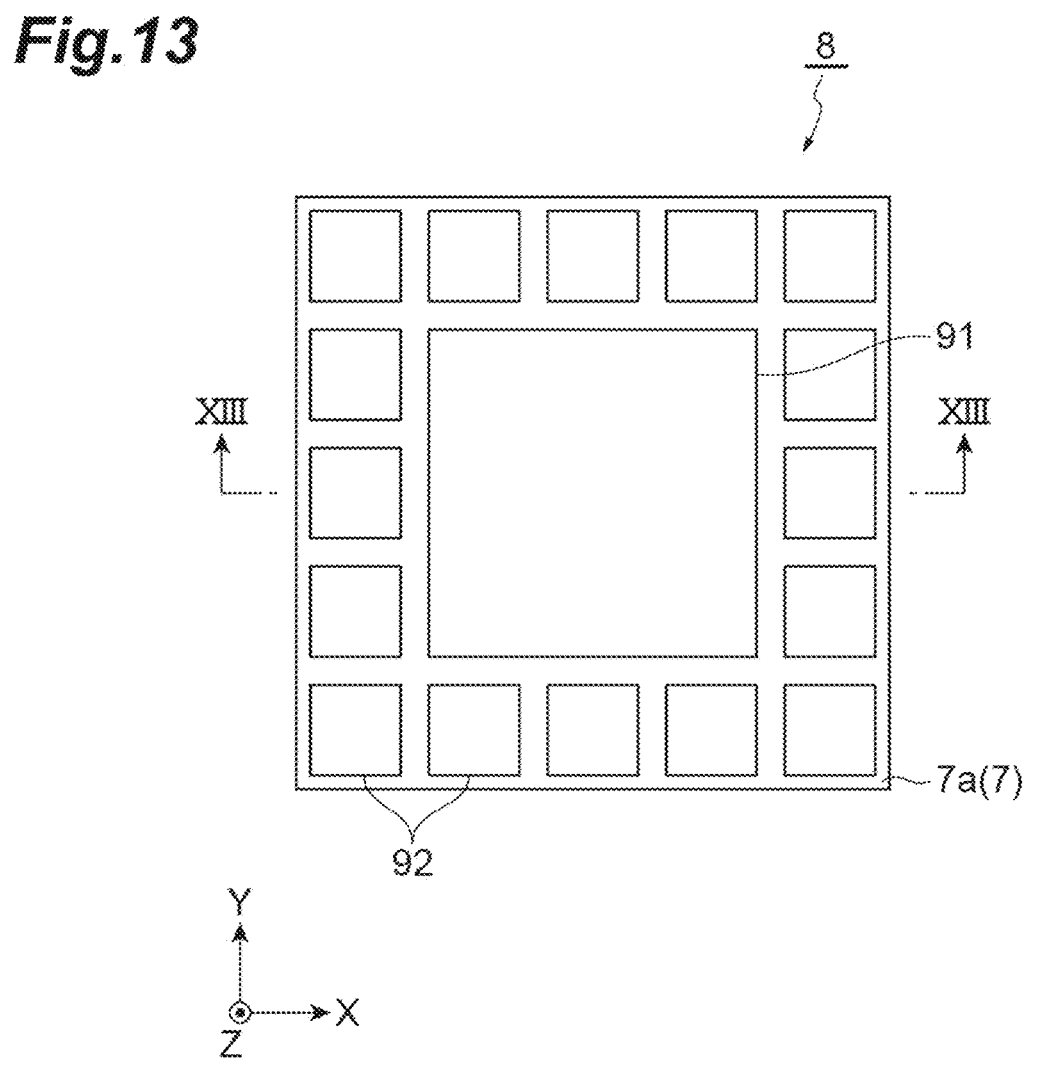
Figure 14:
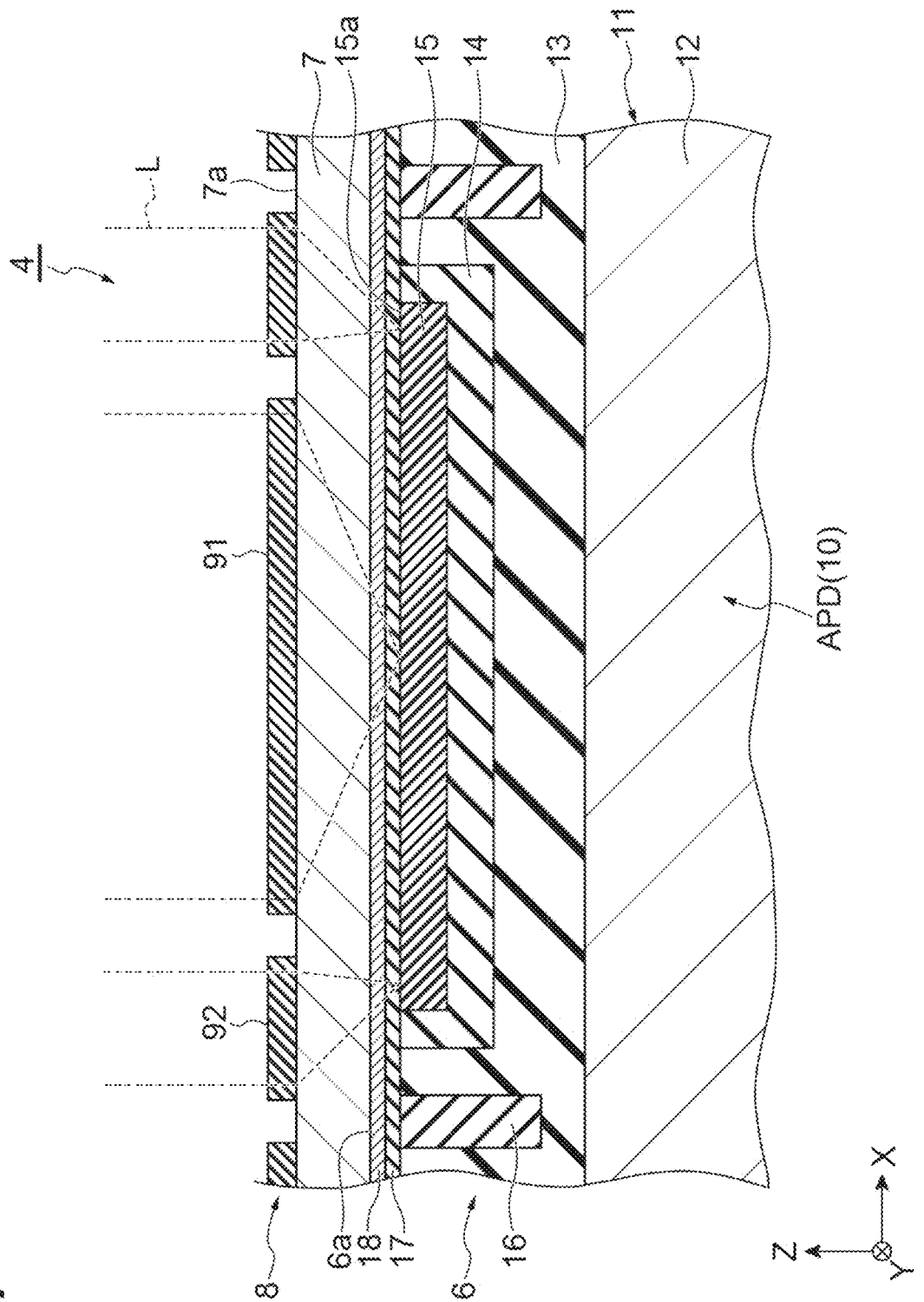
FIG. 14 is a cross-sectional view of a portion of a photodetector along line XIII-XIII illustrated in FIG. 12.

In addition, as illustrated in FIGS. 13 and 14, the meta-lens portion 8 may have a first meta-lens 91 and a plurality of second meta-lenses 92 as the plurality of meta-lenses 9.

When viewed from the Z-axis direction, the area of the first meta-lens 91 is larger than the area of each second meta-lens 92. In addition, when viewed from the Z-axis direction, the plurality of second meta-lenses 92 are arranged to surround the first meta-lens 91. Accordingly, it is possible to reduce the number of a plurality of meta-lenses 9 corresponding to the one avalanche photodiode APD while maintaining the function of the meta-lens 9 as a lens. In addition, the shape, area, arrangement position, and the like of each of the plurality of meta-lenses 9 in the meta-lens portion 8 may not have regularity and/or uniformity, and these can be designed according to the shape and the like of the light-receiving region. It is noted that, in FIGS. 13 and 14, only the portion of the photodetector 4 corresponding to the one photodetecting unit 10 is illustrated.

In addition, the photodetecting element 6 as the SiPM having the plurality of SPADs (photodetecting units 10) may have other configurations such as a configuration in which the arrangement of the N-type semiconductor region and the P-type semiconductor region is reversed. In addition, the photodetecting element 6 may have a configuration other than the avalanche photodiode APD, as a plurality of light-receiving regions. In addition, each meta-lens 9 may condense the light L on the position other than the surface of the corresponding avalanche photodiode APD on the light incident side, and, for example, may condense the light L in the depth direction (opposite direction with respect to the surface of the avalanche photodiode APD on the light incident side) of the light-receiving region. Each meta-lens 9 may condense the light L, for example, on an inner portion of the light-receiving region (for example, within the region of the semiconductor region 15). By allowing each meta-lens 9 to condense the light on an inner portion of the light-receiving region, the focal length of each meta-lens 9 can be allowed to be equal to or larger than the distance T ($\mu$m) from the meta-lens portion 8 to the surface of the avalanche photodiode APD on the light incident side. For this reason, when the outer diameter of each meta-lens 9 is denoted by D ($\mu$m), since the condensing angle $\theta$ is $\tan^{-1}$ (D/2T), the condensing angle can be allowed to be smaller than the condensing angle when light is condensed on the surface of the light-receiving region. Accordingly, the occurrence of stray light can be further suppressed. In addition, the photodetecting element 6 is not limited to a surface incidence type and may be a back incidence type. In addition, the photodetecting element 6 may have the isolation region configured with a first conductivity-type semiconductor region, a second conductivity-type semiconductor region, a light-shielding film, and the like instead of the trench 16. The photodetecting element 6 may not have the isolation region isolating each avalanche photodiode APD.

In addition, the detection target of the radiation detector 2 is not limited to annihilation $\gamma$-rays, and other radiations such as X-rays may be used. In addition, in the radiation detector 2, a light emitter emitting light upon the incidence of radiation is not limited to the scintillator 3, and other light emitters such as Cherenkov radiator may be used.

REFERENCE SIGNS LIST

4: photodetector, 6: photodetecting element, 6*a*: surface, 7: planarizing film, 8: meta-lens portion, 9: meta-lens, 16: trench, 21: light transmissive substrate, 91: first meta-lens, 92: second meta-lens, APD: avalanche photodiode (light-receiving region), L: light.

The invention claimed is:

1. A photodetector comprising:
   a photodetecting element having a surface and including a plurality of light-receiving regions arranged along the surface; and
   a plurality of meta-lens portions arranged on the surface to correspond to the plurality of light-receiving regions,
   wherein, in one light-receiving region and one meta-lens portion corresponding to each other among the plurality of light-receiving regions and the plurality of meta-lens portions, the one meta-lens portion includes a plurality of meta-lenses arranged along the surface, and
   wherein a single period of the plurality of meta-lenses is equal to or smaller than a wavelength of light detected by the photodetecting element.

2. The photodetector according to claim 1,
   wherein the photodetecting element further includes an isolation region isolating each of the plurality of light-receiving regions, and
   wherein, in the one light-receiving region and the one meta-lens portion corresponding to each other, the plurality of meta-lenses are configured to condense light within the one light-receiving region.

3. The photodetector according to claim 2, wherein the isolation region is a trench.

4. The photodetector according to claim 1, further comprising a light-transmitting layer arranged between the surface and the plurality of meta-lens portions.

5. The photodetector according to claim 4,
   wherein the light-transmitting layer is formed directly on the surface, and
   wherein the plurality of meta-lens portions are formed directly on the light-transmitting layer.

6. A photodetector comprising:
   a photodetecting element having a surface and including a plurality of light-receiving regions arranged along the surface; and
   a plurality of meta-lens portions arranged on the surface to correspond to the plurality of light-receiving regions,
   wherein, in one light-receiving region and one meta-lens portion corresponding to each other among the plurality of light-receiving regions and the plurality of meta-lens portions, the one meta-lens portion includes a plurality of meta-lenses arranged along the surface,
   wherein, in the one light-receiving region and the one meta-lens portion corresponding to each other, the one meta-lens portion has a first meta-lens and a plurality of second meta-lenses as the plurality of meta-lenses, and
   wherein an area of the first meta-lens is larger than an area of each of the plurality of second meta-lenses.

7. The photodetector according to claim 6, wherein the plurality of second meta-lenses are arranged to surround the first meta-lens.

8. A photodetector comprising:
   a photodetecting element having a surface and including a plurality of light-receiving regions arranged along the surface; and
   a plurality of meta-lens portions arranged on the surface to correspond to the plurality of light-receiving regions,
   wherein, in one light-receiving region and one meta-lens portion corresponding to each other among the plurality of light-receiving regions and the plurality of meta-lens portions, the one meta-lens portion includes a plurality of meta-lenses arranged along the surface, wherein, in the one light-receiving region and the one meta-lens portion corresponding to each other, when a distance from the one meta-lens portion to a surface of the one light-receiving region is denoted by T ($\mu$m) and an area of the one meta-lens portion is denoted by S ($\mu$m$^2$), Tis $1.0S^{0.5}$ or less.

* * * * *